United States Patent

Berlinghoff et al.

[11] Patent Number: 5,158,488
[45] Date of Patent: Oct. 27, 1992

[54] COMBINED TEACHING AND PRACTICING APPARATUS

[75] Inventors: Frank Berlinghoff; Hans-Walter Lang, both of Leutkirch, Fed. Rep. of Germany

[73] Assignee: Kaltenbach & Voigt GmbH & Co., Biberach/Riss, Fed. Rep. of Germany

[21] Appl. No.: 623,197

[22] Filed: Dec. 6, 1990

[30] Foreign Application Priority Data

Dec. 14, 1989 [DE] Fed. Rep. of Germany ....... 3941332

[51] Int. Cl.$^5$ .............................................. G09B 9/00
[52] U.S. Cl. ...................................... 434/263; 434/262; 433/77
[58] Field of Search ............... 434/262, 263, 267, 270, 434/432; 269/901; 16/21; 248/169; 433/77, 79

[56] References Cited

U.S. PATENT DOCUMENTS

| | | | |
|---|---|---|---|
| 1,719,306 | 7/1929 | Pieper et al. | 433/79 |
| 2,304,609 | 2/1937 | Horowitz et al. | 433/79 |
| 2,308,812 | 1/1943 | Jankelson | 433/77 |
| 3,445,934 | 5/1969 | Harris | 433/79 |
| 3,636,633 | 1/1972 | Fuller et al. | 433/77 |
| 4,035,920 | 7/1977 | Saupe | 434/263 |
| 4,160,323 | 7/1979 | Tracy | 433/77 |
| 4,221,060 | 9/1980 | Moskovitz et al. | 434/264 |
| 4,249,900 | 2/1981 | Hoelzer et al. | 433/79 |
| 4,286,949 | 9/1981 | Holt, Jr. | 433/77 |
| 4,948,077 | 8/1990 | Gonzalez | 248/129 |

FOREIGN PATENT DOCUMENTS

| | | |
|---|---|---|
| 694146 | 1/1945 | Fed. Rep. of Germany. |
| 1923998 | 2/1965 | Fed. Rep. of Germany. |
| 2451618 | 5/1976 | Fed. Rep. of Germany. |
| 2710756 | 9/1978 | Fed. Rep. of Germany. |
| 2053255 | 6/1979 | Fed. Rep. of Germany ...... 434/263 |
| 3127614 | 1/1983 | Fed. Rep. of Germany ...... 434/263 |
| 3325499 | 1/1985 | Fed. Rep. of Germany. |

Primary Examiner—Richard J. Apley
Assistant Examiner—Rachel M. Healey
Attorney, Agent, or Firm—Scully, Scott, Murphy & Presser

[57] ABSTRACT

A combined teaching and practicing apparatus. The apparatus is adapted for an optimized simulation and practice in dental-clinical work or operating procedures, as well as also being adapted for purely dental-technical work and which, in addition thereto, ensures that the apparatus is suited for right-handed as well as left-handed persons, and which affords for an optimum savings in space at uniformly maintained quality in the teaching or educating of the students.

19 Claims, 4 Drawing Sheets

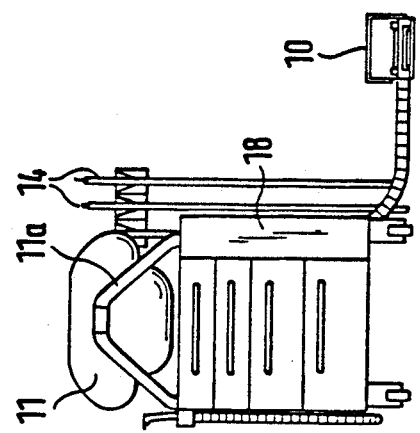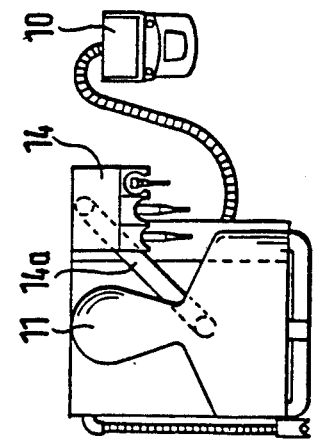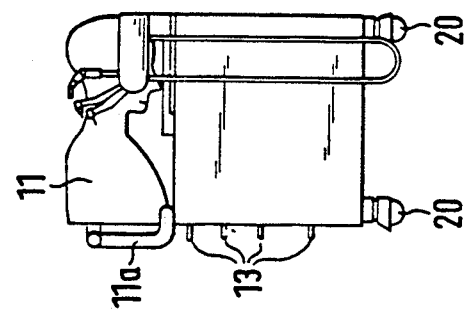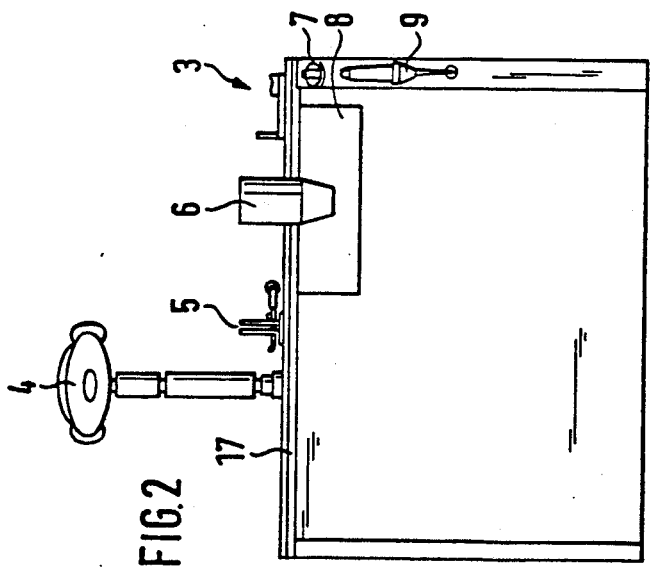

COMBINED TEACHING AND PRACTICING APPARATUS

BACKGROUND OF THE INVENTION

1. Field of the Invention

The present invention relates to a combined teaching and practicing apparatus.

2. Discussion of the Prior Art

In the disclosure of German Patent 24 51 618, there is illustrated and described in detail a teaching and practicing apparatus for the simulation and practice of dental-clinical work or operating procedures; however, with the apparatus not being suitable for dental-technical work.

In contrast with the foregoing publication, the disclosure of German Patent 27 10 756 elucidates the construction of a teaching and practicing apparatus which can only be utilized for dental-technical work procedures.

Thus, on the one hand, for dental-clinical work sequences and, on the other hand, for dental-technical work sequences, heretofore there was always required the utilization of two different types of apparatus, which at least required a demand for an increased amount of space in various facilities; for example, in universities.

SUMMARY OF THE INVENTION

Accordingly, it is an object of the present invention to develop a novel teaching and practicing apparatus which is adapted for an optimized simulation and practice in dental-clinical work or operating procedures, as well as also being adapted for purely dental-technical or technician work and which, in addition thereto, ensures that the apparatus is suited for right-handed as well as left-handed persons, and which affords for an optimum savings in space at uniformly maintained quality in the teaching or educating of the students.

The foregoing object is inventively attained through the provision of a combined teaching and practicing apparatus for the simulation and practice of dental-clinical operating procedures and for the implementation of dental-technical or technician work steps.

The advantages of this invention reside in that only a single apparatus is necessary for both teaching purposes, and as a result thereof, a considerable amount of space is saved without reducing the quality in teaching. The range of applicability of the apparatus is improved, the apparatus is equally well adapted for use by right-handed and left-handed persons, and through the suitable positioning or placement of the part of the apparatus employed for the dental-clinical operating procedures, there is ensured a teaching which practically simulates reality, as well as a considerable savings in space in both positions of use and non-use.

BRIEF DESCRIPTION OF THE DRAWINGS

Further embodiments and advantages of the invention may now be more readily ascertained from the following detailed description of exemplary embodiments thereof, taken in conjunction with the accompanying drawings; in which:

FIG. 2 illustrates a view of the stationary apparatus adapted for dental-technical work;

FIG. 3a illustrates the movable or displaceable apparatus for dental-clinical operating procedures, as shown in a side elevational view;

FIG. 3b illustrates the apparatus of FIG. 3a shown in a front view;

FIG. 3c illustrates the apparatus of FIG. 3a shown in a top plan view;

DETAILED DESCRIPTION

Figure 1:
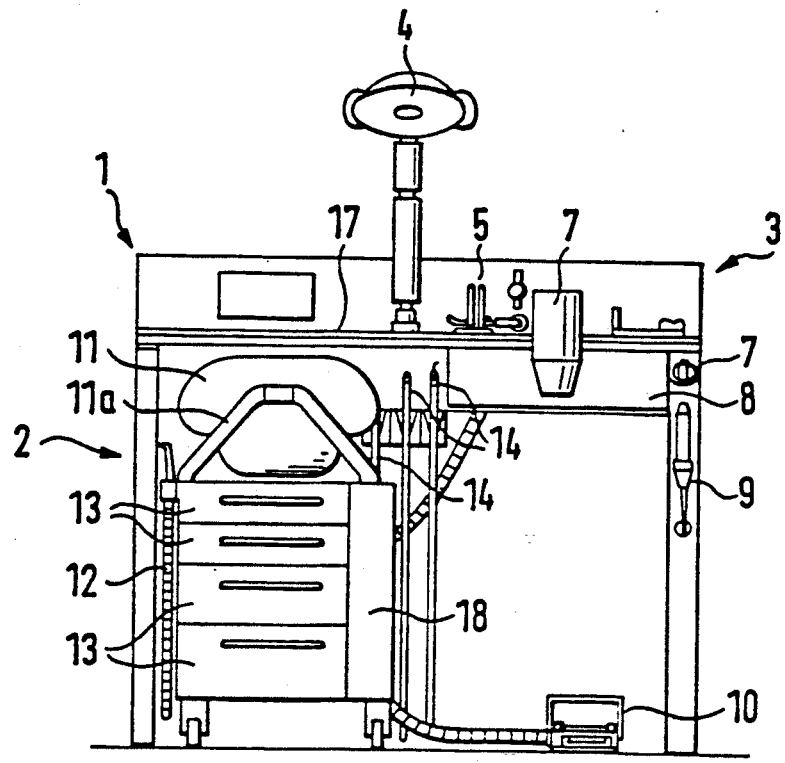
FIG. 1 illustrates a front elevational view of the assembled inventive apparatus.

Referring in particular to FIG. 1, the subject matter of the invention essentially resides in a combination 1 consisting of a movable or displaceable dental teaching and practicing apparatus 2 for the simulation of dental operating procedures, and in a stationary or positionally fixed dental-technical or technicians teaching and practicing apparatus 3 for dental-technical work sequences. The stationary apparatus 3 supports, on a work plate or surface 17 thereof, an illuminating device 4, a bunsen burner 5, a suctioning hood or aspirator 6; and carries on its framework an air blower 8 and a electric motor 9 for the drive of different dental-technical worktools or implements. Reference numeral 10 identifies a central foot-pedal control arrangement for controlling the various dental instruments which are present in the apparatus 2.

On its upper surface, the movable apparatus 2 supports, mounted on its surface on a pivot arm 11a, a simulated or phantom head or a phantom bust 11. Arranged therebelow are drawers 13 for the receipt and storage of dental instruments and auxiliary aids; in addition to a sputum or saliva collector and/or a spray-fog aspirating device, which are both identified together by reference numeral 12. In an advantageous manner, the displaceable apparatus can possess a smaller constructional size than the currently known teaching and practicing apparatus for dental-clinical operating procedures.

As is indicated in FIGS. 2 and 3, the displaceable apparatus 2, in its position of non-use as shown in FIG. 1, can be positioned beneath the work plate or surface 17 within an open space provided in the stationary apparatus 3. For this purpose, the phantom head 11 can be tilted forward on its pivot arm 11a, so that the overall height of the apparatus 2 becomes lower than that of the open space beneath the work plate 17. In this position it is not only possible to facilitate the positioning of the apparatus 2 within the open space, but to simultaneously protect the mouth opening portion of the phantom head 11. Additionally, the work plate 17 also protects the entirety of the phantom head 11.

Figure 4:
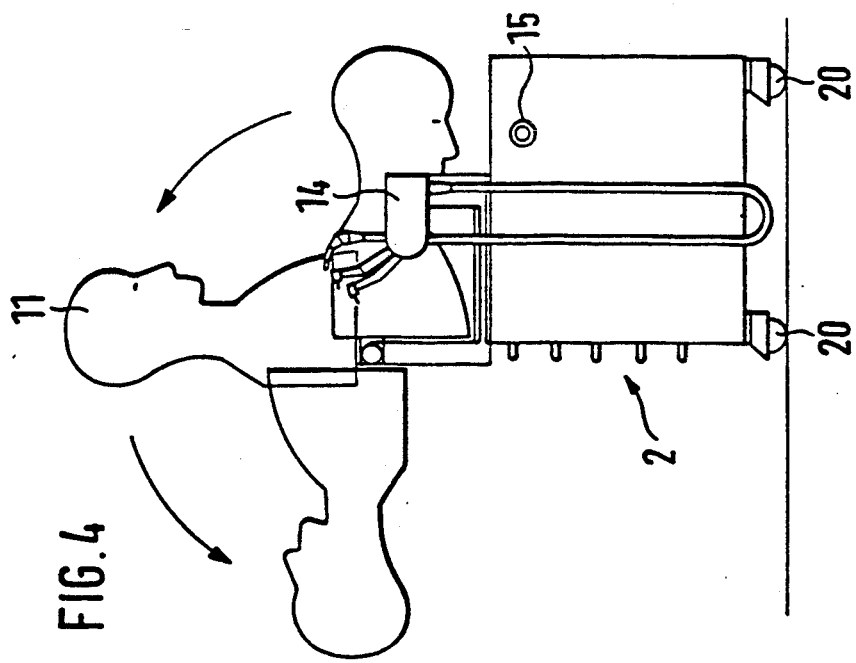
FIG. 4 illustrates the apparatus of FIG. 3a with attached phantom or simulated head shown in three positions thereof.
Figure 6A:
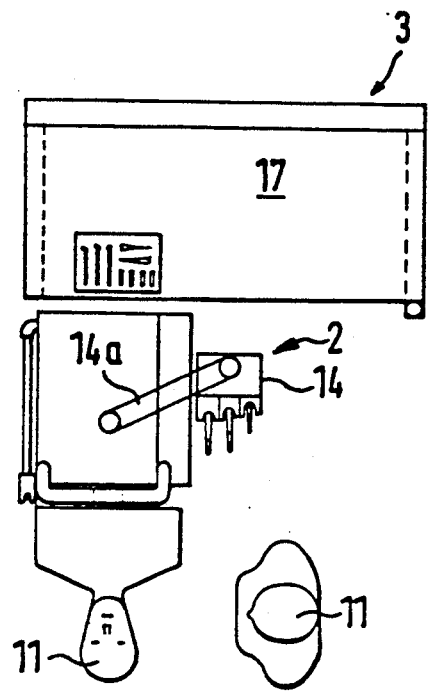
FIG. 6 illustrates, in four variations, the adjustability and displaceability of the movable apparatus for the dental-clinical operating procedures with regard to the stationary apparatus for the dental-technical work steps.
Figure 6B:
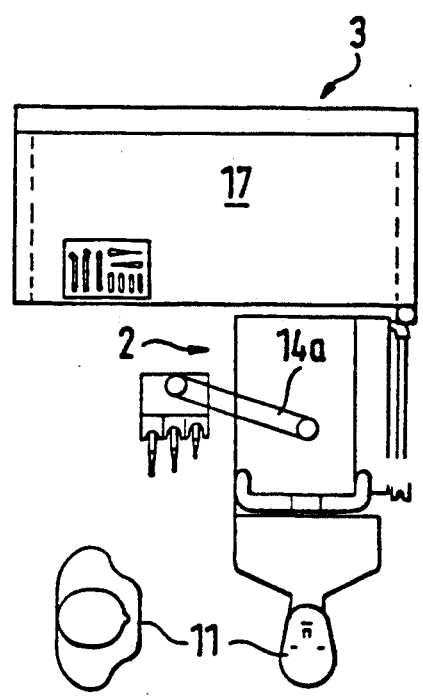
Figure 6C:
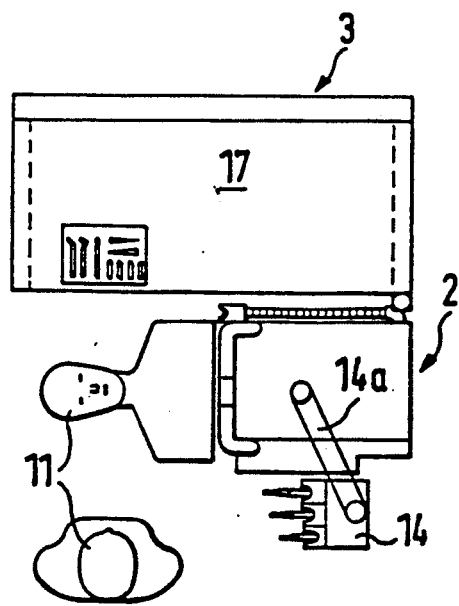
Figure 6D:
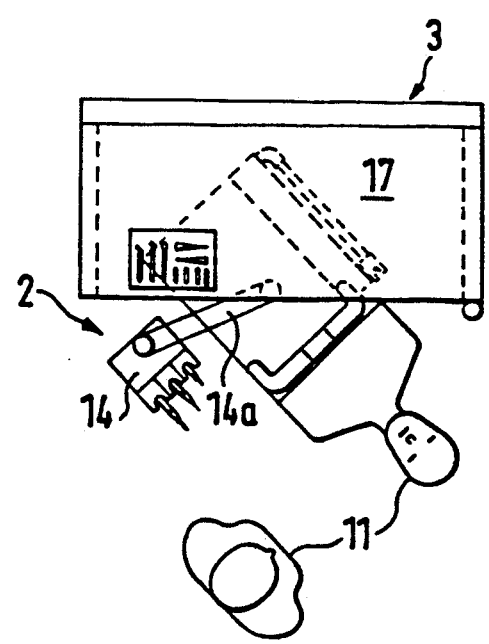

FIG. 4 illustrates the aspect that the phantom head 11 is able to assume different positions; namely, besides the forwardly tilted position, also operative positions, of which there is illustrated the vertically oriented and the prone positions. The positions are continually adjustable and the pivot arm 11a can be arrested in every position thereof.

Adjacent the phantom head 11, there is also arranged a carrier or holder 14 for dental instruments, whereby the carrier is mounted on a pivot arm 14a so as to be pivotable through an angle of at least 180°. This serves the purpose that not only can the movable apparatus 2, as is illustrated in FIG. 6, be brought into a suitable position, in accordance with the condition of space; but also the carrier 14 can be adjusted in such a manner that a right-handed person, as well as a left-handed person can find an arrangement which is suitable or comfortable to him.

Figure 5B:
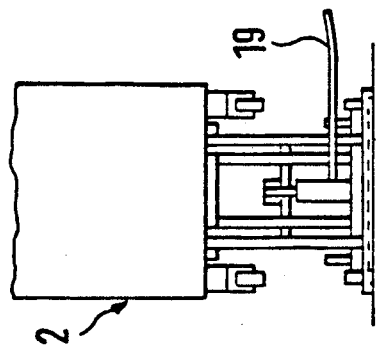
FIG. 5b illustrates the lower portion pursuant to FIG. 5a as shown in a front view.
Figure 5A:
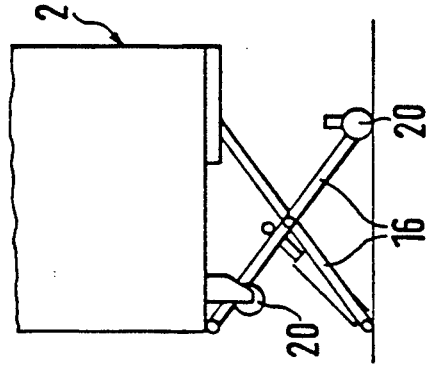
FIG. 5a illustrates the lower portion of the apparatus of FIG. 2 as shown in side view.

As is illustrated in FIGS. 5a and 5b, the movable apparatus 5 can also be equipped with an adjustment in height, which allows the apparatus to be adjusted in conformance with the body size of the person working therewith. The adjustment in height can be carried out mechanically and/or hydraulically and/or automatically by means of a foot-operated pedal 19, and for this purpose is equipped with a scissors-linkage arrangement 16. The apparatus is continually adjustable and arrestable in position.

Pursuant to FIG. 4, the apparatus 2 can have a suctioning connector 15 of an exhaust or aspirating aggregate 18 (FIG. 1) for liquid and/or dust connected therewith.

In order to improve the displaceability between locations for the movable apparatus 2, there can be mounted rollers 20 either directly on the apparatus or on the scissors linkage arrangement 19, as shown in FIGS. 2, 3a, 4 and 5a. It is also possible to fasten a pair of rollers 20 to the apparatus itself and the other pair of rollers 20 to the scissors linkage arrangement 16, as is illustrated in FIG. 5a. The last-mentioned arrangement allows that even with the scissors linkage arrangement 16 raised, the apparatus 2 can still be moved. Instead of the rollers, there can also be provided skids or the like.

What is claimed is:

1. Combined teaching and practicing arrangement for the simulation and practice of dental-clinical operating procedures and for the implementation of dental-technical work sequences, including a movable dental teaching and practicing apparatus and a stationary dental-technical teaching and practice apparatus; said movable apparatus being displaceable relative to said stationary apparatus and incorporating hingedly connected thereto a dummy upper torso portion consisting of at least a phantom head and in the non-use position thereof said movable apparatus being insertable into an open space provided in the stationary dental-technical teaching and practicing apparatus, said movable apparatus having a cabinet including rollers and drawers for the storage of instruments and auxiliary aids in the lower portion thereof; and a pivot arm being mounted on said cabinet, said upper torso portion being fastened to said pivot arm, said cabinet with the upper torso portion thereon having an overall height dimensioned to enable insertion of said cabinet beneath a work surface on said arrangement.

2. Arrangement as claimed in claim 1, wherein said upper torso portion is tiltable forwardly into a non-use position thereof.

3. Arrangement as claimed in claim 2, wherein said upper torso portion is upwardly and rearwardly displaceable into a useable position.

4. Arrangement as claimed in claim 3, wherein the position of said upper torso portion is continuously adjustable between said non-use and said useable portions.

5. Arrangement as claimed in claim 1, wherein said pivot arm is arrestable in every position thereof.

6. Arrangement as claimed in claim 1, wherein said moveable apparatus includes means for adjusting the height of said apparatus.

7. Arrangement as claimed in claim 6, wherein said adjusting means facilitates a continuous adjustment in the overall height of said movable apparatus.

8. Arrangement as claimed in claim 6, wherein said means for adjusting the adjustment in height is a mechanical structure.

9. Arrangement as claimed in claim 6, wherein said means for adjusting the adjustment in height is a pneumatic device.

10. Arrangement as claimed in claim 6, wherein said means for the adjustment in height of said movable apparatus comprises a scissors linkage arrangement.

11. Arrangement as claimed in claim 6, wherein said adjustment in height of said movable apparatus is arrestable in every position thereof.

12. Arrangement as claimed in claim 1, wherein said rollers are mounted on said movable apparatus for enabling the displacement of said apparatus.

13. Arrangement as claimed in claim 10, wherein said rollers are mounted on said scissors linkage arrangement for effectuating the displacement of said movable apparatus.

14. Arrangement as claimed in claim 1, wherein a saliva ejector is operatively associated with said movable apparatus.

15. Arrangement as claimed in claim 1, wherein a spray-fog aspirator is operatively associated with said movable apparatus.

16. Arrangement as claimed in claim 1, wherein a holder for dental instruments is attached to the movable apparatus.

17. Arrangement as claimed in claim 16, wherein said holder is attached to a pivot arm so as to be pivotable through an angle of at least 180°.

18. Arrangement as claimed in claim 1, wherein a central foot-operated pedal is located on said movable apparatus for controlling the functions of dental instruments associated with said apparatus.

19. Arrangement as claimed in claim 1, wherein said movable apparatus includes an aspirating connector for a suctioning aggregate for aspirating fluids and dust.

* * * * *